Dec. 24, 1968 C. H. CLARK ET AL 3,417,690

ROLLING CONTACT PRINTER HAMMER AND HAMMER CARRIAGE

Original Filed Oct. 25, 1962 8 Sheets-Sheet 1

INVENTORS
CLAYTON H. CLARK
DONALD J. STEFANIK

BY Strauch, Nolan, Neale, Nies & Bronaugh
ATTORNEYS

ROLLING CONTACT PRINTER HAMMER AND HAMMER CARRIAGE

Original Filed Oct. 25, 1962 8 Sheets-Sheet 2

| ↑ | ↓ | BAUDOT 5 4 3 2 1 | LTR DRUM POSITION | FIG. |
|---|---|---|---|---|
| 3 | E | 0 0 0 0 1 | 2 | 34 |
| – | A | 0 0 0 1 1 | 4 | 36 |
| BELL | S | 0 0 1 0 1 | 6 | 38 |
| 8 | I | 0 0 1 1 0 | 7 | 39 |
| 7 | U | 0 0 1 1 1 | 8 | 40 |
| $ | D | 0 1 0 0 1 | 10 | 42 |
| 4 | R | 0 1 0 1 1 | 11 | 43 |
| ' | J | 0 1 0 1 1 | 12 | 44 |
| , | N | 0 1 1 0 0 | 13 | 45 |
| ! | F | 0 1 1 0 1 | 14 | 46 |
| : | C | 0 1 1 1 0 | 15 | 47 |
| ( | K | 0 1 1 1 1 | 16 | 48 |
| 5 | T | 1 0 0 0 0 | 17 | 49 |
| " | Ƶ | 1 0 0 1 0 | 18 | 50 |
| ) | L | 1 0 0 1 0 | 19 | 51 |
| 2 | W | 1 0 0 1 1 | 20 | 52 |
| # | H | 1 0 1 0 0 | 21 | 53 |
| 6 | Y | 1 0 1 0 1 | 22 | 54 |
| ¢ | P | 1 0 1 1 0 | 23 | 55 |
| 1 | Q | 1 0 1 1 1 | 24 | 56 |

| ↑ | ↓ | BAUDOT 5 4 3 2 1 | LTR. DRUM POSITION | FIG. |
|---|---|---|---|---|
| 9 | O | 1 1 0 0 0 | 25 | 57 |
| ? | B | 1 1 0 0 1 | 26 | 58 |
| & | G | 1 1 0 1 0 | 27 | 59 |
| . | M | 1 1 1 0 0 | 29 | 61 |
| / | X | 1 1 1 0 1 | 30 | 62 |
| ; | V | 1 1 1 1 0 | 31 | 63 |
| | FIGS | 1 1 0 1 1 | 28 | 60 |
| | LTRS | 1 1 1 1 1 | 32 | 64 |
| | SPACE | 0 0 1 0 0 | 5 | 37 |
| | CAR. RET | 0 1 0 0 0 | 9 | 41 |
| | LINE FEED | 0 0 0 1 0 | 3 | 35 |
| | BLANK | 0 0 0 0 0 | 1 | 33 |

INVENTORS
CLAYTON H. CLARK
DONALD J. STEFANIK
BY Strauch, Nolan, Neale, Nies & Bronaugh
ATTORNEYS Dec. 24, 1968 C. H. CLARK ET AL 3,417,690

ROLLING CONTACT PRINTER HAMMER AND HAMMER CARRIAGE

Original Filed Oct. 25, 1962 8 Sheets-Sheet 3

INVENTORS

CLAYTON H. CLARK
DONALD J. STEFANIK

BY Strauch, Nolan, Neale, Nies & Brounagh
ATTORNEYS

ROLLING CONTACT PRINTER HAMMER AND HAMMER CARRIAGE

Original Filed Oct. 25, 1962 8 Sheets-Sheet 4

INVENTORS
CLAYTON H. CLARK
DONALD J. STEFANIK
BY Strauch, Nolan, Neale, Nies & Bronaugh
ATTORNEYS INVENTORS
CLAYTON H. CLARK
DONALD J. STEFANIK
BY Strauch, Nolan, Neale, Nies & Bronaugh
ATTORNEYS

ROLLING CONTACT PRINTER HAMMER AND HAMMER CARRIAGE

INVENTORS

CLAYTON H. CLARK
DONALD J. STEFANIK

BY Strauch, Nolan, Neale, Nies & Bronaugh
ATTORNEYS

INVENTORS
CLAYTON H. CLARK
DONALD J. STEFANIK
BY Strauch, Nolan, Neale, Nies & Bronaugh
ATTORNEYS

ROLLING CONTACT PRINTER HAMMER AND HAMMER CARRIAGE

Original Filed Oct. 25, 1962 8 Sheets-Sheet 8

INVENTORS
CLAYTON H. CLARK
DONALD J. STEFANIK

BY Strauch, Nolan, Neale, Nies & Brouaugh
ATTORNEYS

United States Patent Office 3,417,690

Patented Dec. 24, 1968

3,417,690
ROLLING CONTACT PRINTER HAMMER AND HAMMER CARRIAGE

Clayton H. Clark, Mundelein, and Donald J. Stefanik, Berwyn, Ill., assignors to SCM Corporation, New York, N.Y., a corporation of New York Original application Oct. 25, 1962, Ser. No. 233,109, now Patent No. 3,291,909, dated Dec. 13, 1966. Divided and this application May 2, 1966, Ser. No. 546,670
14 Claims. (Cl. 101—93)

ABSTRACT OF THE DISCLOSURE

Together with a rotary type carrier printer, there is a pivotally mounted print hammer with its head movable toward and away from the type carrier and a pivotally mounted operator for operating the print hammer, with rolling kinematic pairing between the print hammer and the operator. An electromagnet coacts with an armature of the operator to pivot the operator which engages and pivots the print hammer to drive its head toward the type carrier. A carriage shiftable lengthwise relative to the type carrier includes first and second sets of such pivotally mounted print hammers and operators.

This invention relates to a receiving page printer utilizing a continuously rotating print drum and a traveling print hammer carriage, primarily intended for either fixed station or vehicular installation as sending monitors or printing receivers in telegraphic communication systems. Nevertheless, it is versatile and readily adapted for use with other data processing applications.

*Cross-reference to related application*

This application is a division of copending application Ser. No. 233,109, filed Oct. 25, 1962, now Patent No. 3,291,909.

A drum type of page printer is one form of high speed rotary type carrier printers to which the present invention is applicable. Accordingly, a drum printer embodiment is herein described as an exemplary printer. The drum is composed of a plurality of rings of type, the type symbols in each ring being arranged in identical sequence and aligned with matching type symbols. A print hammer, which is mounted upon a print hammer carriage assembly, is moved from left to right in front of the drum and is actuated to press an ink ribbon against the paper record and the drum at an appropriate rotational position of the drum to print a desired character at that carriage position. A pulse clock assembly on the drum printer supplies a series of pulses, as the drum rotates, to the printer electronics in accord with the angular positions of the characters on the drum. These pulses are processed in the printer electronics and compared to the incoming or monitored keyboard signals to thereafter cause energization of the print hammer solenoid as the desired character moves in front of the hammer. Characters on each ring of type are identical and are placed in binary order according to the desired code. Each character is assigned a position in binary progression of a counter, e.g., a 64 count counter, so that the printer electronics can compare an incoming character code signal combination against the series of pulses that indicate the physical position of the drum characters. The electronics in the present invention as described in said parent application Ser. No. 233,109 uses continuous counting and comparison.

Primarily, the improvements of this present invention involve the universal print hammer carriage assembly which may be used as a single print hammer carriage or a dual print hammer carriage. Each print hammer and its associated operating mechanism, consisting of an electromagnet and an operating armature, can be removed or installed without affecting the operation of the other print hammer assembly. A further improvement resides in the elimination of mechanical operated control switches at the various limits of travel of the print hammer carriage and, instead, the print hammer carriage uses a high strength miniature permanent magnet secured in the print hammer carriage to magnetically operate glass encapsulated reed switches to control the printer electronics for various automatic functions.

*Summary of the invention*

Accordingly, a primary object of this invention resides in the provision in a high speed printer of a novel shifting hammer carriage with a removable novel universal dual or plural hammer mounting and guide block.

Still another object resides in the provision of an improved high speed printer with continually rotating type carrier and a traveling hammer carriage with at least one low mass print hammer and hammer operator carried by the carriage, the coaction between the hammer and the operator enabling efficient direct force transfer by a rolling pairing in accomplishing the printing stroke. In conjunction with this object, it is a further object to utilize a light spring to forward bias the hammer operator and a relatively heavier spring to return bias the hammer, providing coordinated spring forces to prevent hammer rebound and dampen bounce tendencies resulting from hammer return movement after printing impact.

Still another object resides in the provision in a printer of a novel universal print hammer mounting assembly utilizing, in unitary combination, either a single or plural hammers and single or plural hammer operators.

A still further object resides in the provision of a shiftable print hammer carriage for a rotatable type carrier, page printer in which, the carriage has a universal body to mount single or plural hammers with associated single or plural hammer operators, a space pawl unit and a permanent magnet serving as a carriage position signal operator.

Another object resides in the provision of a novel print hammer carriage having at least one low mass hammer head on the end of a miniature hammer lever and including a short hammer lever operating arm, and a miniaturized electromagnet with an armature operator including a relatively long lever arm engaging the short hammer lever arm and adapted, when energized, to transfer movement and impart momentum to the print hammer lever for a printing operation. In conjunction with the foregoing object, a further object resides in the provision of involute contours at the respective engaging surfaces of the armature operator and the short arm of the print hammer lever to accomplish a rolling operative engagement during printing force transfer.

Still another object resides in the provision of a novel assembly of a miniaturized print hammer lever and a miniature electromagnet with armature operator lever for use in combination with a universal mounting device for single or plural hammer printers, wherein energization of the electromagnet results in a smooth force transfer of movement from the armature lever to the hammer lever with resultant inertia movement of the hammer lever away from the armature lever to accomplish momentum printing impact with a type carrier, the hammer lever being biased in a return direction by a compression spring and the armature operator being forward biased toward energized position with a spring having lighter spring force than the hammer lever spring, to provide damping of rebound and bounce tendencies of the components upon the return stroke of the hammer.

Further novel features and other objects of this invention will become apparent from the following detailed description, discussion and the appended claims taken in conjunction with the accompanying drawings showing the subcomponent structures and units constituting the present invention, in which:

*General*

Figures 1, 2:
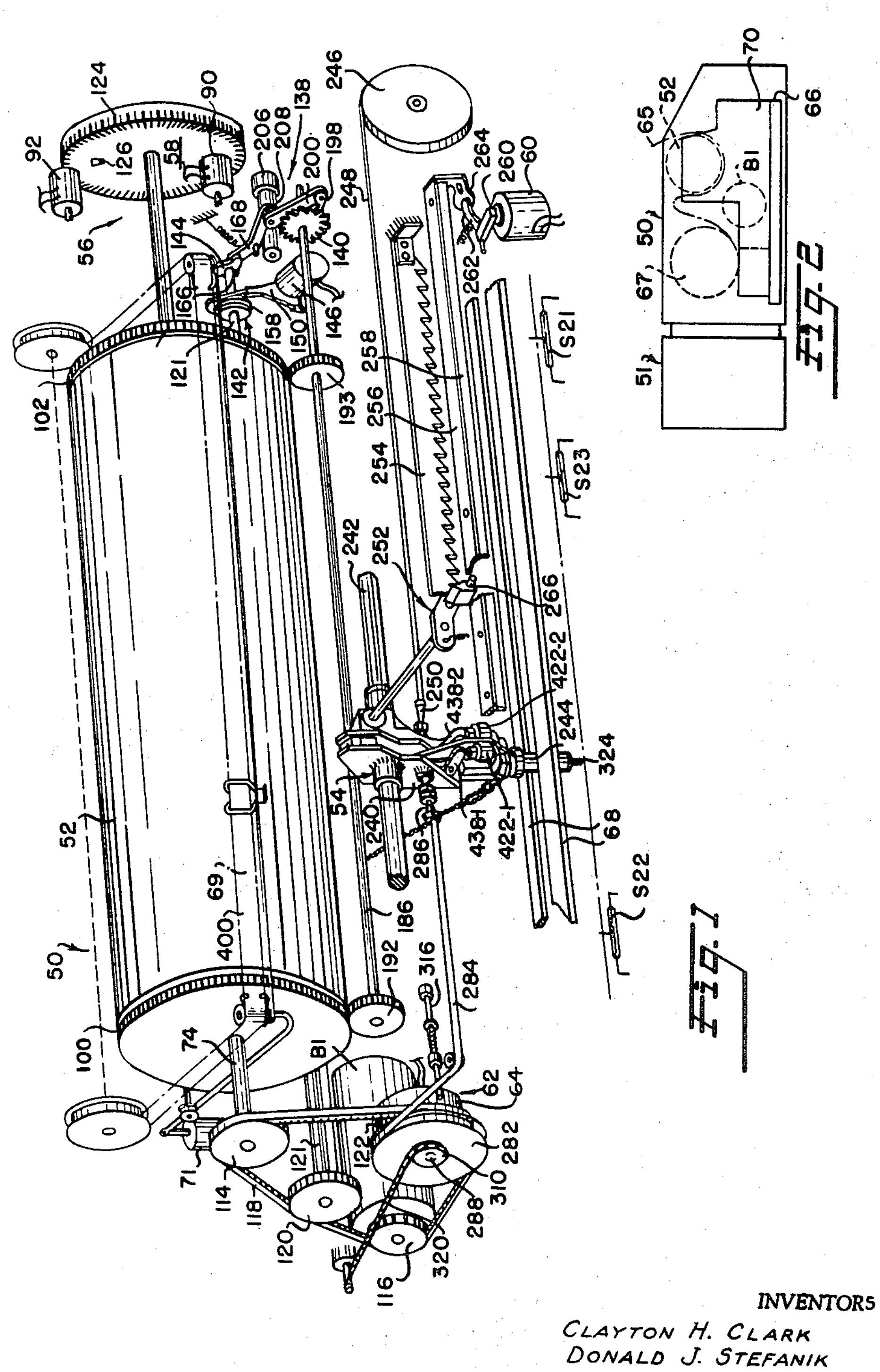
FIGURE 1 is a front perspective skeleton view illustrating the major mechanical components of a drum printer which utilizes the print hammer, hammer operator and carriage in accord with the present invention. Although this view omits many details utilized in such a drum printer they are not deemed necessary to an understanding of the present invention.
FIGURE 2 is a reduced scale, side view of the complete printer with a module containing the printer electronics at the rear.

The major mechanical components of the exemplary drum printer, including those of the hammer carriage assembly pertinent to this invention, are shown in the skeleton arrangement of FIGURE 1 and will be generally described before proceeding with a detailed description of the hammer and carriage mechanisms. The frame structure of the printer, the ribbon feed and reverse mechanism and various manual control switches are not shown in FIGURE 1, however, a representative somewhat similar drum printer assembly can be found in copending application Ser. No. 184,820 to which reference may be had, if necessary, for a complete understanding of the printer construction.

The printer is designed primarily for use in a send-receive teleprinter set, being used for page copy monitoring and/or page copy receiving.

The single hammer embodiment is capable of operating at nominal average speeds up to and including 200 w.p.m. on a half duplex neutral signaling channel. If dual print hammers are utilized, with double step character spacing, average operational maximum speed is appreciably increased, up to at least 400 w.p.m. Further multiplication of the number of print hammers with a correlated increase in character spaces per stepping action will result in the attaining of higher operational speeds.

By various suitable arrangements of the printer electronics and by using different fonts of type faces on the print drum the printer can accommodate codes other than the five-unit Baudot code, for example, the seven-unit alfa-numerical field data code could be utilized if desired.

In general, the printer mechanics 50 employs a motor driven rotating type drum 52 which, for standard communications printers, will have 72 rings of type, each type ring having the 52 standard communications symbols.

Characters on each ring of type are similarly placed in binary order according to the Baudot code for the character, each character being assigned a position in a 64 count binary progression so that the printer electronics can compare an incoming character code against a code combination representative of the series of pulses subsequent to an index position which indicates the physical position of the drum characters relative to that indexing position. When comparison matches, coincidence, the electronics logic can determine exactly when to actuate the print hammer for printing the character when the drum rotates that character in front of the print hammer.

The complete drum 52 includes on its cylindrical periphery a plurality of different horizontal lines of identical information symbols, for a conventional telegraph printer, seventy-two (72) identical symbols, e.g., seventy-two A's, constituting one line of identical character type faces extending along the cylindrical drum periphery parallel to the drum axis. The drum 52 and an attached drum position clock wheel 58 are continuously rotated by a printer motor B1 when the motor is running. Related printer electronics are described in parent application Ser. No. 233,109.

As depicted in FIGURE 1, a print hammer carriage assembly 54 is mounted for stepped spacing movement in a horizonal path from left to right and return movement from right to left in front of the type drum 52. The illustrated hammer carriage assembly 54 is universal in nature and can accommodate one or two print hammers with associated operating components.

Depending upon the style of drum and the arrangement of printer electronics utilized, a print hammer mechanism could be energized to strike the drum one or more times during a 360° rotation of the print drum. In the exemplary single hammer disclosure however, a print action can occur within a range from 180° rotation to 540° rotation, because of a built-in delay permitting 180° rotation of the drum after coincidence is determined to assure sufficient time for lifting the ink ribbon to print position before the directed printing action. Also, in the single print hammer embodiment, a drum rotation of 360° is required to obtain the next coincidence for a repeated character, which is followed by the 180° delay. In the dual hammer embodiment print action can occur within a range from 0° to 360° rotation, if the ribbon lift action is omitted.

The printing mechanism includes an induction pulse clock assembly 56 which supplies one index pulse and a series of character position pulses to the printer electronics, representative of drum rotational position. The index pulse is used only to initially synchronize the electronics when the printer drum is started to rotate. Since each character position pulse represents a different character reaching a definite drum rotational position, the pulse constitutes information which allows the printer electronics to energize the print hammer solenoid as the desired character moves in front of the hammer, or to actuate different machine functions if the received code signal combination are function signals.

The print hammer carriage 54 is stepped across in front of the drum 52 and parallel to the drum axis by spacing mechanism actuated by a spacing solenoid 60 mounted at the right hand side of the printer. Carriage 54 is power driven to a start-of-line position at the left-hand margin by a carriage return mechanism 62, seen at the left hand side of FIGURE 1. Carriage return mechanism is activated by the carriage return magnetic clutch 64, power for carriage return being derived, through clutch 64, from the printer motor B1.

Shown diagrammatically in FIGURE 2, a sheet paper strip record medium 65 is supplied from a paper roll 67 mounted behind the drum 52, the paper strip feeding over suitable guide devices (not shown), under and up past the front of the drum 52, passing between the drum 52 and the print hammer carriage 54 and under two side edge top guide fingers (not shown). The paper strip 65 then passes on out of the top of the printer unit 50.

Paper feed is enabled by cooperation of two large friction banded feed wheels at the ends of the drum and two pressure rolls under the drum which press the paper against the two large feed wheels which are selectively, incrementally driven.

Seen in skeleton form in FIGURE 1, an ink ribbon 69 passes across the drum face parallel to the drum between the print hammer and the paper to transfer the typed impression from the drum to the page during a print operation. The ink ribbon assembly feed and reverse mechanism is conventional and details are not shown. However, the ink ribbon 69 in this printer passes in a straight stretch across the front of the drum 52 parallel to the character spacing path of the print hammer, and the entire straight stretch of the ink ribbon if desired can be lowered and lifted by action of a ribbon lift solenoid 71 to a position in front of the hammer just prior to each printing action. This operation enables viewing of the line being printed without its being obscured by a permanently placed stretch of ink ribbon.

The printer components are mounted on a support structure which includes a thick base plate 66 (FIGURE 2) incorporating a slotted center track 68 (FIGURE 1) which passes laterally from one side of the printer to the other and under the path of travel of the print hammer carriage 54. Two vertical side plates 70 and 72 (see FIGURE 4) are rigidly secured to the base plate 66 and provide mounting structure for most of the printer components. Support structure details are not shown in FIGURE 1, but portions of the base plate and side plates can be seen in some of the other figures.

The printer electronics is preferably transistorized and mounted either in a module 51 (FIGURE 2) on the back of the printer mechanics or incorporated in large printed circuit boards secured on the underside of the printer frame structure.

The electric drive motor B1 supplies rotational driving power to the printer mechanism 50 by means of a drive belt 118 which connects the motor to the drum shaft, a function power shaft and a carriage return clutch. Drive belt 118 passes around a drive pulley 116 attached to the motor shaft and to three driven pulleys 114, 120 and 122, which will be later referred to in more detail.

Figure 3:
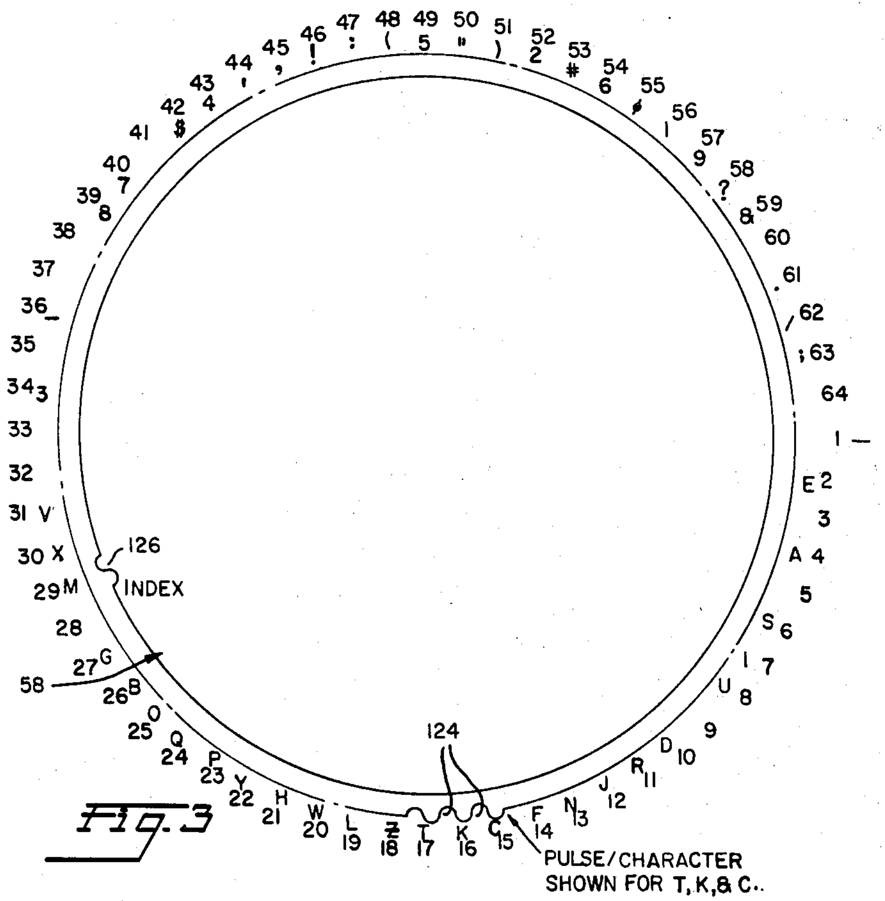
FIGURE 3 is a chart showing relative drum positions for each of the characters and the Baudot code assigned to each character.

In the exemplary printed, 64 positions (see FIGURE 3) are provided around the periphery of each type wheel 76 in the drum and all desired characters (letters and figures) are accurately located at specific angular positions which enables accurate character positions determination by means of a 64-notch induction pulse clock wheel 58.

The clock wheel 58 is nonrotatably secured to the right hand end of drum shaft 74 and has peripheral character reference notches 124 properly located relative to the angular positions of the print characters on the drum 52 and one index notch 126 located radially inside of the path of notches 124. The positioning of the monitor heads 90 and 92 will provide one indexing pulse and 64 reference pulses once during each rotation of the print drum 52, although the index pulse is utilized only whenever the print drum starts to rotate. As the clock wheel 58 rotates with the print drum 52, the moving notches vary the reluctance of bar type magnets located in the clock monitor head coils 90 and 92 inducing appropriate current pulses into associated transistor amplifiers, as is described hereinafter.

A left hand bearing retainer assembly is placed over the left hand end of the drum shaft 74. A somewhat similar right hand bearing retainer assembly 84 (FIGURE 4) and shaft bearing are placed over the right hand end portion of drum shaft 74. The right hand bearing assembly 84, shown in FIGURE 2, is telescoped over a sleeve boss 86 which is integral with and projects from one side of a clock head mounting and timing disc 88. The disc 88 mounts the two printer clock monitor heads 90 and 92 in desired positions, as diagrammatically illustrated in FIGURE 1. By means of the two adjusting screws 93 and 93', illustrated in FIGURE 5, the angular position of the timing disc 88 relative to the print line can be adjusted to make incremental changes of the index and reference pulse count positions for purposes to be discussed hereinafter.

Figure 4:
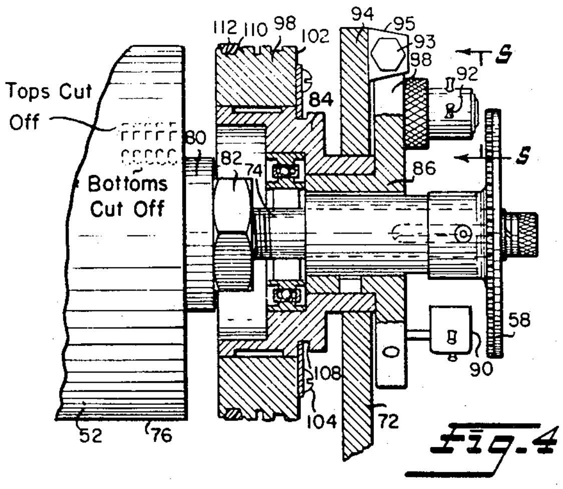
FIGURE 4 is a partially sectioned detail view in elevation, illustrating the right-hand end of the print drum, its rotational mounting, one paper feed wheel and the clock assembly with its adjustable reading head timing support disc.
Figure 5:
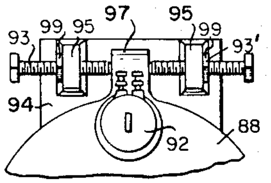
FIGURE 5 is a detail end view of the reading head timing support disc taken on line 5—5 of FIGURE 4.
Figure 6:
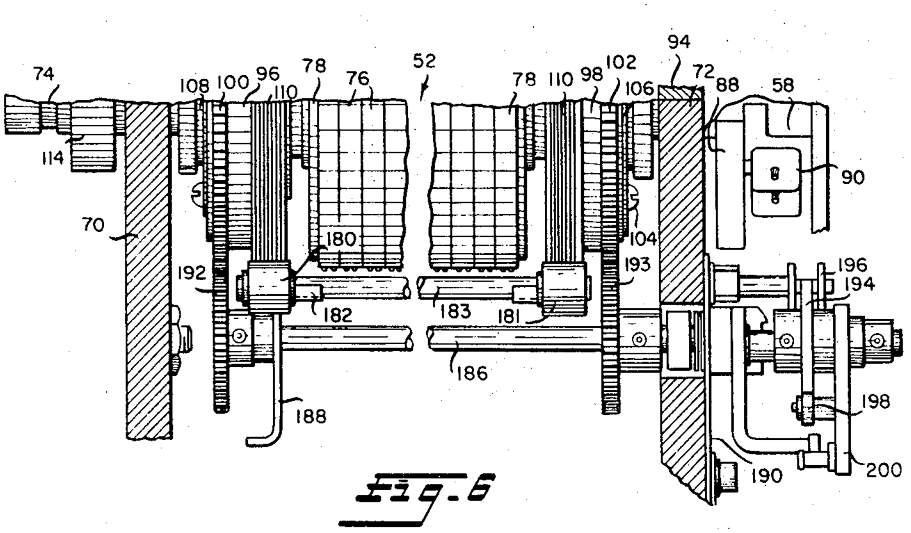
FIGURE 6 is a partially sectioned elevation view of the lower half of the print drum illustrating the relationship between the print drum, the frame end supporting plates and the paper feed components.

The drum end bearing retainers are clamped in sockets on top of respective printer frame end plates 70 and 72 by clamping caps such as the right-hand clamp cap 94 seen in FIGURES 4 and 5. The right-hand end plate cap 94 has two spaced apart lugs 95 on its outer face, the lugs having threaded bores that receive the two opposed timing disc adjusting screws 93 and 93', the ends of which engage an integral angular positioning finger 97 on the timing disc 88. Adjusting screws 93 and 93' are locked in adjusted position by lock nuts 99.

The purpose of the timing disc adjustment is to insure proper time correlation between the received character coincidence count pulse from the character clock head to the printer electronics and the print strokes of the hammer or hammers, correlation depending upon the angular fixed position of the clock heads, so that the printed characters are not cut off at the top or bottom as depicted in FIGURE 4.

To determine need of adjustment the printed characters (FIGURE 4) are checked visually while the unit 50 is receiving a message from a sending device. If adjustment is necessary, the right bearing cap machine screws are loosened so that the sleeve boss 86 of timing disc plate 88 is held friction tight. The adjusting screw lock nuts 99 (FIGURE 5) are loosened to permit backing the adjusting screws 93 and 93' away from the timing disc finger 97.

If the tops of the printed characters are being cut off, the rear adjusting screw 93' is turned in until the printing requirement is met, and its hexagonal nut 99 tightened. If the bottom of the printed characters are being cut off, the front adjusing screw 93 is turned in until the requirement is met, and lock nut is tightened. The bearing cap machine screws are tightened and the other adjusting screw is positioned against the opposite side of the timing disc finger 97, and locked with its lock nut.

The left-hand end of the drum shaft 74 projects beyond the left-hand frame end plate 70 and a gear toothed pulley 114 is nonrotatably secure thereto by set screws. Turning back to FIGURE 1, the printer motor B1, which will be mounted on the printer support structure inside of frame plate 70, is disposed with its shaft parallel to the drum shaft 74 and carrying a toothed drive pulley 116. The notched drive belt 118 meshes with the teeth in motor pulley 116, and with the other three pulleys, the drum pulley 114, a function shaft pulley 120 and a carriage return clutch input pulley 122. As has been described hereinbefore, whenever the printer motor B1 is energized, the drum 52 will be continually rotating, and printing occurs "on the fly."

*Print hammer carriage spacing and return mechanism*

The print hammer mechanism per se, is materially different from that disclosed in copending application Ser. No. 184,820 and will be fully described hereinafter. For purposes of describing the carriage spacing and return mechanisms and operations, it will be apparent from FIGURE 1 that the hammer carriage assembly 54 consists of a major body piece 240 which serves to guide the carriage movement, carries the spacing pawl, anchors the spacing and return belts, acts as an operator to provide carriage position signal information to the printer electronics, and carries the print hammer(s) and operating assembly(ies).

As seen in FIGURE 1, the upper portion of carriage body 240 has two side wings with coaxial through bores which carries split nylon slide bushings and rides on a fixed carriage rail 242 secured parallel to the drum axis. An eccentrically, adjustably mounted bottom carriage guide roller 244 rides between guide rails 68 which are spaced above and suitably fastened to the frame base plate 66 (see FIGURES 1 and 8). The carriage 54 is driven to the right by biasing spring force from a conventional carriage drive coil spring in a spring drum (see FIGURE 1), through the medium of a spacing belt 248. Spring drum 246 is mounted on the outside of the right hand printer frame plate 72 and the end of space belt 248 is secured in an end fitting 250 screwed into the right hand side of the carriage body 240.

The carriage assembly 54 is permitted to be spaced across in front of the drum from left to right and is held in print position by the action of a space pawl unit 252, carried on the front of carriage body 240, in controlled cooperation with a fixed ratchet toothed space rack 254. The space pawl unit 252 includes a single tooth on a pivoted arm operated against spring bias by a horizontal space bail 256 secured on a pivotally mounted shaft 258 passing in front of the space ratchet rack 254 and journalled in the rack end brackets 270 and 272, (FIGURES 7–9) which are fixed on the printer frame end plates. Actuation of space bail 256 in a cyclic rocking movement for each spacing actuation is accomplished in 6 ms. by a spring biased space solenoid assembly 60.

Figures 7, 8, 9:
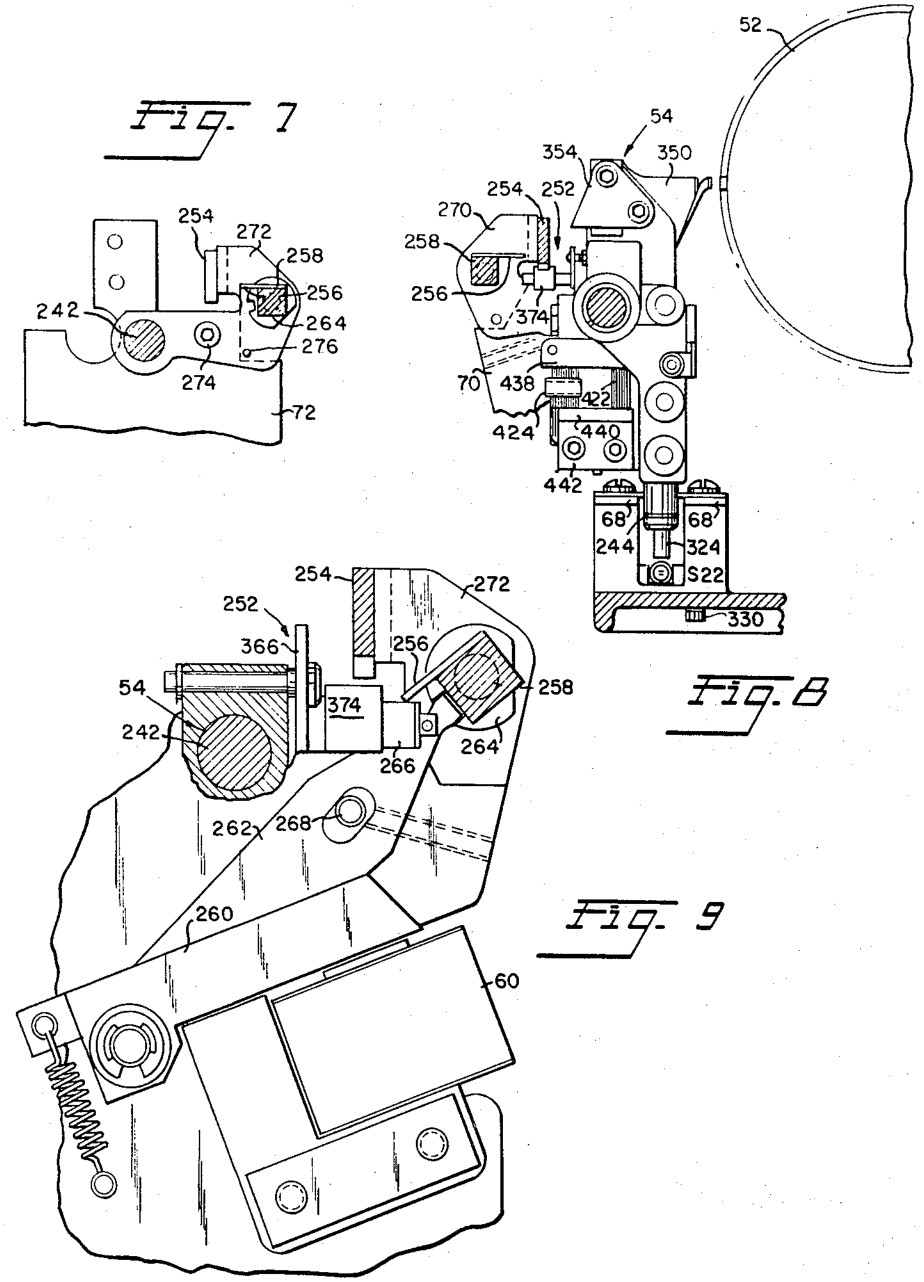
FIGURE 7 is a detail view illustrating one of the end brackets for the space rack.
FIGURE 8 is a side view showing the print hammer carriage and its relationship to the printer base, the spacing rack and the print drum.
FIGURE 9 is an enlarged detail view taken from the opposite side as the view in FIGURE 8 and illustrates the cooperation between the print hammer spacing pawl, the fixed space rack, the spacing bail and the spacing solenoid, the components being in solenoid energized condition.

Each time the space solenoid 60 (mounted on the inside of the right hand frame end plate 72) is energized, its armature 260 is pulled against the solenoid core to the position shown in FIGURE 9. Movement of an attached operating arm 262 on armature 260, through cooperation with a notched collar 264 on space bail shaft 258, rocks the space bail 256 downwardly, causing bail 256 to hit a bail follower roller 266 journalled on the end of the space pawl 374 and moving the pawl unit down, against spring tension, away from engagement with a tooth on the space rack 254. When the space pawl unit 252 is forced out of engagement with the space rack 254, the carriage spacing spring drum 246, which always urges the space belt 248 onto the drum, starts the carriage 54 moving to the right. The space pawl unit 252 is released immediately just as the carriage starts moving to the right; the solenoid 60 remaining completely energized only about 5 milliseconds. In moving back to its engaged upper position and also to the right as the carriage spaces, the space pawl tooth 374 abuts the vertical face of the next tooth on the space rack 254 stops the carriage 54 in accurately predetermined position.

Note: the pin 268 seen in FIGURE 9 is an adjustable fixed stop pin, eccentrically mounted in frame end plate 72, to cooperate with a slot in the space solenoid operating arm 262 and thereby limit the movement of the space bail 256 between pawl engaged and disengaged positions.

As has been discussed hereinbefore, the carriage assembly 54 can include either a single or dual print hammer assemblies. When used as a single print hammer carriage, the printer electronics will result in the space solenoid 60 being energized to permit the carriage 54 to be drawn one space to the right each time a character is printed or a space function is received. In such a single hammer assembly, the space rack 254 will have teeth spaced apart a distance equal to one character space. When dual hammers are used, the space rack will have teeth spaced apart a distance equal to two character spaces, and the dual hammer printer electronics, as will be described hereinafter, directs a print operation to the left-hand or the right-hand print hammer and the next character is printed by the remaining right-hand or left-hand hammer followed by a mechanical spacing operation under control of space solenoid 60. Depending upon which hammer is set to print the next incoming signal code combination, a signal calling for a space function, either steers the electronics from the left (#1) to right (#2) hammer or it energizes the space solenoid and simultaneously steers the electronics from the #2 to the #1 hammer. In a dual hammer assembly, the left or #1 hammer is always ready for operation in accord with the next incoming signal combination when the carriage is at start-of-line position.

More than two hammers could be used, e.g., four hammers, in which case the spacing between the rack teeth will be a correlated number of character spaces and the electronics logic will have to be modified.

In operation, the space rack 254 is fixed, being suitably rigidly secured to rack end brackets 270 and 272. Rack brackets 270 and 272, in turn are adjustably secured by screws 274 on respective printer frame end plates 70 and 72. Screws 274 pass through oversize holes in brackets 270 and 272 and the abutment pins 276 are eccentrically mounted on the brackets enabling slight adjustments of the rack location relative to the release position of the space pawl 252, as is shown in FIGURE 9.

*Carriage return.*—The carriage return mechanism returns the carriage 54 to the left-hand margin, or start-of-line position, under positive motor drive.

The major mechanical aspects of the carriage return mechanism are disclosed in FIGURE 1. The mechanism to accomplish carriage return may be actuated in several ways: (1) by receipt of a coded carriage return character; (2) by actuation of an automatic carriage return switch S21; or (3) by actuation of a manual switch (not shown, but shown and described in the aforedescribed parent application). Switch S21 is operated after the carriage 54 has spaced to the right-hand margin for printing of the 72nd or last character, at which position the carriage mounted, depending eccentric guide roller 244 is adjacent the end of its track 68.

During carriage return movement, the space pawl could be permitted to ratchet backwards over the inclined rear faces of the rack teeth, but it is not desirable from a viewpoint of resultant rapid wear of both the pawl and teeth as well as a noise factor. Accordingly, simultaneously with energization of the magnetic clutch return mechanism 62, the printer electronics causes the space solenoid 60 to be energized and held energized until the carriage 54 reaches the left-hand start-of-line position.

Shown somewhat diagrammatically in FIGURE 1 are three magnetically actuated, glass encapsulated, reed switches S21, S22 and S23 which are adjustably mounted directly under and aligned in a direction parallel with the path of movement of the print hammer carriage. A miniature high strength permanent magnet 324, bonded in the roller retainer on the bottom of the carriage body 240 moves with the carriage in a path located immediately adjacent but clearing the upper side of the three reed switches S21, S22 and S23. The reeds in each switch are steel with gold plated contacts, normally spaced a minute distance apart. When the magnet 324 passes above a switch the flux path at the end of the magnet passes into the steel reeds and they close, completing an associated circuit to the printer electronics to accomplish functions. Such reed switches are commercially available.

*Carriage and print hammer.*—Although character selection is accomplished electronically, the actual printing of the character is done mechanically by the print hammer mechanism (FIGURES 10–17). When a character is selected, coincidence determined and printing is in order, a print coil of a small electromagnet is energized, pulling the associated armature toward the core. As the armature is pulled toward the core, a print hammer lever connected to the armature, imparts momentum to the print hammer which moves to impact with the ribbon, paper and print drum to print the desired character. The print hammer return spring restores the print hammer and the armature to the reset position after the print coil has been de-energized.

Before proceeding to a detailed description of hammer operation, the carriage and print hammer assembly components will be described with primary reference to the exploded perspective, FIGURE 10. The single piece body 240 carries one or two print hammer assemblies, the bottom guide roller 244, the switch operating permanent magnet 324, the space pawl assembly 252 and a shifting ribbon lift guide 334, being provided with a multiplicity of mounting pads, bosses, bores, and threaded holes to mount the numerous components.

The two laterally spaced apart side bosses 336 and 337 are situated on forwardly disposed side extensions and are provided with coaxial through bores 338 and 339 into which are inserted split sleeve, nylon liners 340 and 341 which serve as bearings to guide the carriage along the rigid guide rod 242 seen in FIGURE 1. The front side of each guide boss is a mounting pad with threaded blind bores 342 for mounting a spring plate 344 by means of screws 346.

Above the two guide bosses are two vertical, spaced apart support plates 348 and 349 which bracket and locate the hammer block 350, the block 350 being rigidly secured between the plates by two screws 352 (one shown) which pass through a pawl over travel stop plate 354, the two support plates 348, 349, and the block 350, threading into a nut plate 356. A forwardly projected finger 358 on the pawl over travel stop plate 354 extends above a pawl engagement position stop pin 360 which is force fit into a bore in the main carriage body 240.

Figures 14, 15:
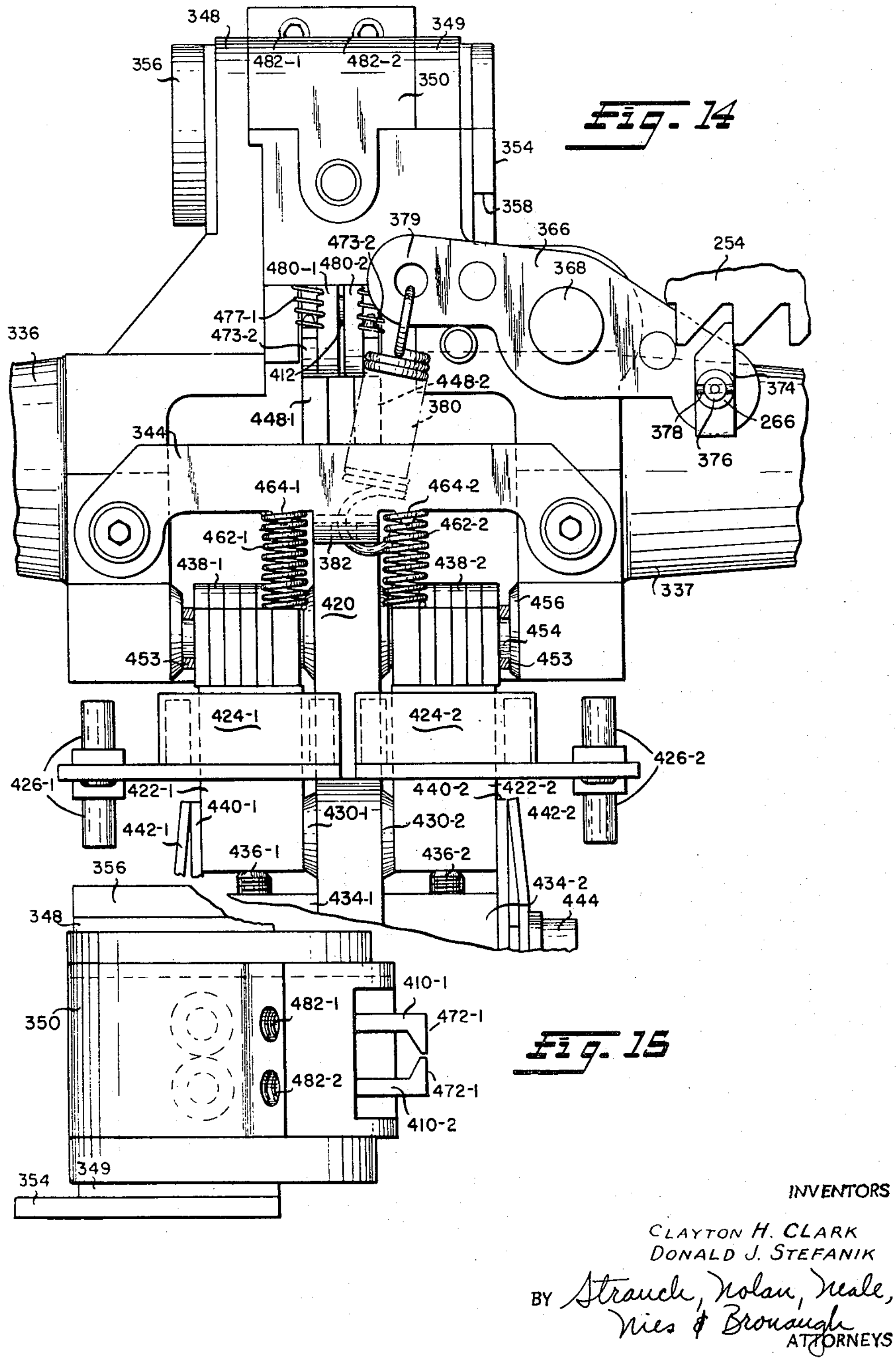
FIGURE 14 is a front elevation of the dual print hammer and carriage assembly to the same scale as FIGURE 11.
FIGURE 15 is a detail top view showing the universal print hammer block incorporating dual print hammers.

To the right of the rack engagement stop pin 360, carriage body 240 is formed with a space pawl pivot boss 362 having a fore and aft through bore receiving a sleeve journal 364. Spacing pawl assembly 252 consists of a double arm lever 366 with a rigid, rearwardly projecting pivot post 368 which is pivotally disposed through the sleeve bearing 364 and is axially retained by a clip washer 370. The right hand arm of space pawl lever 366 has rigidly secured thereto a forwardly projecting pawl piece 372 with a hardened midportion shaped as a single tooth pawl 374. Pawl piece terminates in a front stub axle 376 which journals the pawl bail contacting roller 266. Roller 266 is retained on axle 376 by a small roll pin 378. The other arm 379 of pawl lever 366 serves to anchor a biasing spring 380 and also as a limit stop engaging member, being disposed in assembly under the over travel stop plate finger 358 and over the engagement position stop pin 360. Tension biasing spring 380 connects between the pawl lever spring arm 379 and a spring anchor lug 382 on the rear side of the spring plate 344 and, in an inactive condition or carriage stop position, biases the pawl spring arm down against the stop pin 360 as shown in FIGURES 1 and 14. When the pawl tooth 374 is disengaged from the rack, it is due to a downwardly exerted pressure by space bail 256 on the roller 266 which rolls along the lip of the bail, with movement of the carriage.

A lower heavy portion 386 of carriage body 240, situated toward the rear of the carriage, has a vertical blind bore (not shown) which receives a top vertical post 388 of a guide roller retainer 390, the guide roller 244 fitting over a lower cylindrical journal portion 392 and against a lower retainer flange 394. Post 388 and cylinder journal 392 are eccentric to enable minute adjustments of the guide roller relative to the carriage body which moves the hammer block 350 closer to or further away from the print drum. A set screw 396 in body 240 clamps the retainer post 388 in the carriage body as well as retaining it in its adjusted eccentric location.

The reed switch operating permanent magnet 324 fits into a coaxial blind bore (not shown) in the lower end of guide roller retainer 390 and is bonded in place, e.g., by an epoxy cement. The magnet 324 is about 7/16" long and 1/8" in diameter and extends approximately 1/4" from the retainer.

Figures 11, 12, 13:
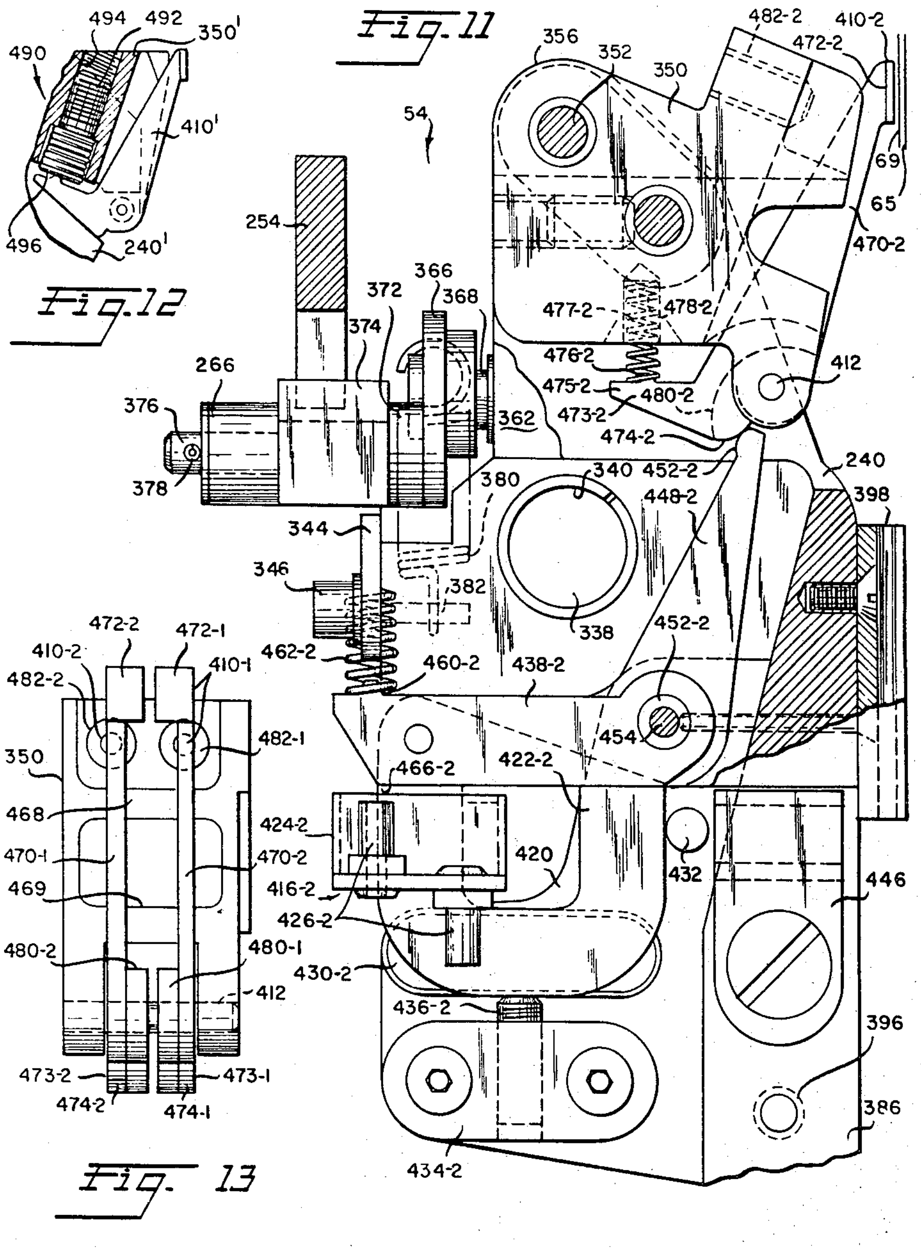
FIGURE 11 is a greatly enlarged partially sectioned side elevation of the print hammer carriage with dual hammers, illustrating the relative positions of the magnet armature operator and the print hammer just after energization of the print hammer magnet and prior to actual impact of the print hammer against the ribbon, to press the paper against the character type on the drum.
FIGURE 12 is a detail side view illustrating a modified print hammer stroke adjustment arrangement.
FIGURE 13 is a detail rear view of a universal print hammer block and dual hammers, drawn to the same scale as that of FIGURE 11.

The carriage shifted ribbon lift 334 is slidably carried in a ribbon lift guide track 398 which is fastened to the rear wall of carriage body 240 by screws (see FIGURE 11). A lower horizontally bent finger 399 on the ribbon lift 334 fits in a channel strip 400 (see FIGURE 1) that extends across the face of the print drum, under the ink ribbon 69 and connects to and moves vertically with the ribbon lift mechanism. The mechanism will assure the positive lifting and holding steady of that portion of the ink ribbon which is located immediately in front of the print hammer(s).

Returning to FIGURE 10, it will be apparent that only one print hammer 410 (the left-hand hammer) is illustrated and is located in the hammer block 350, being pivoted on a pin 412 pressed into aligned cross bores in the lower end of the block 350. This exploded FIGURE 10 perspective intentionally shows only one hammer and one hammer operating assembly although the carriage and the hammer block will also mount a second hammer and operating assembly as clearly illustrated in FIGURES 11 and 13–15. Hammer mounting, hammer details and structural relationship with the armature operating lever will be described in following paragraphs referring to FIGURES 12–17.

As will be more fully described, the hammer block 350 is open at the bottom and the carriage body 240 has an open space below the hammer block, permitting an operative structural relationship between each hammer and its associated operator. The left-hand hammer operating assembly 414 includes an electromagnet 416 and armature operator 418 which are mounted on the left hand side of the front partition wall 420 on carriage body 240.

Electromagnets 416, per se, are commercially available, extremely efficient and of small size, having ribbon wound U-shaped cores 422 to concentrate the flux path along the core metal stress lines. A miniature coil 424 encircles one of the core legs and the coil terminals 426 are connected to dual leads 428 which (see FIGURE 1) pass back under the print drum 52 and plug into the printer electronics. Leads 428 are sufficiently long and flexible that they do not interfere with carriage movement.

Figure 10:
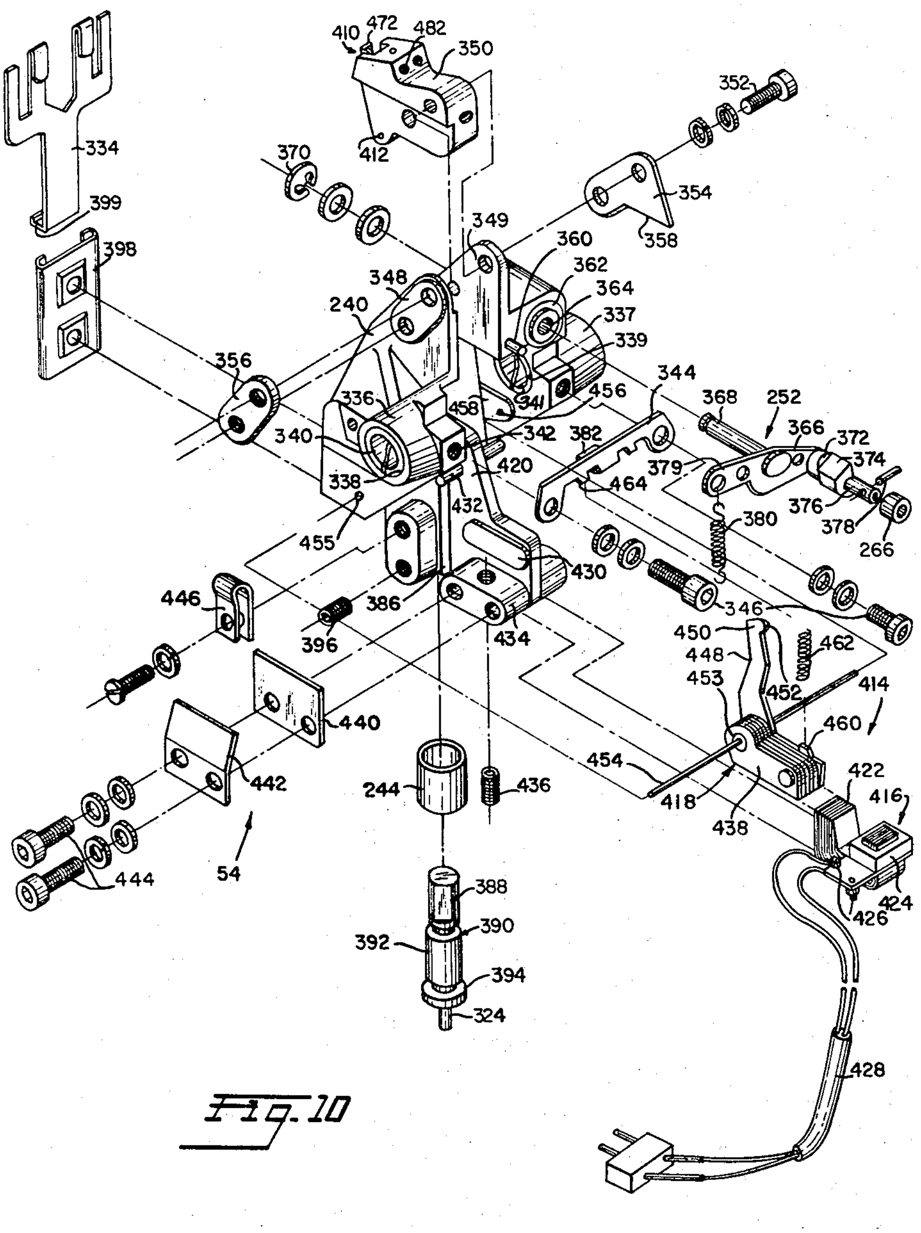
FIGURE 10 is an exploded perspective of all components of the universal print hammer carriage showing one print hammer assembly and associated operated mechanism.

In FIGURE 10, the electromagnet 416 is placed with one side of the bight of core 422 against a carriage body pad 430 and the rear surface of the rear vertical core leg rests against a locator pin 432. Pin 432 is press fit through the partition wall 420 and serves as a rear locator for both magnets in the dual assembly. The bight of magnet core 422 does not rest on the lateral boss 434 but rather abuts the end of a core height (or gap) adjusting screw 436 which is threaded through the boss 434 as shown in FIGURE 11. Adjustment of the screw 436 enables an appropriate gap to be set between the end faces of core 422 and the lower surface of armature 438 before the core is clamped to the carriage body. Since core 422 is ribbon wound, to prevent damage, it is clamped against a relatively large flat surface of pad 430 by a a flat plate 440 and a bent spring plate 442, the two plates and the magnet core 422 being secured by screws 444 through the plates, but not the core, and into the boss 434. Leads 428 pass rearwardly through a lead clamp 446, secured to the associated side of the carriage body, to avoid strain on the connections of leads 428 to the coil terminals as the carriage 54 moves to the left and right.

Armature operator 418 consists of the laminated armature 438, one of the laminations adjacent the partition wall 420 including an upwardly extended operator arm 448, the top end 450 of which has a curved abutment contour 425 which, as will be described, provides the connection for force transfer between the armature and the hammer. A lateral bushing 452 adjacent the rear end of armature 438 serves to pivotally mount the armature on an armature shaft 454 which is placed into coaxial bores 455 and 456, shown in FIGURE 10. The bushing 452 fits close but free between the partition wall 420 and pads 458 (the right-hand pad being seen in FIGURE 10) and thereby maintains alignment of the armature through its path of pivotal movement. Set screws (not shown) hold shaft 454 in its bores. A spring seat lug 460 at the front of armature 438 locates a light compression coil spring 462, the upper end of which seats over a spring lug 464 on the lower edge of the aforedescribed spring plate 344. The light spring force of spring 462 urges the armature in a direction toward the pole faces of magnet core 422, however a stronger hammer spring, to be described, will overpower the armature spring 462 during de-energized condition to pivot the armature 438 away from the magnet core. In the armature operated (energized) position (see FIGURES 11 and 17), a minute air gap between armature 438 and core 422 can be maintained if desired by placing a thin strip 466 of dielectric, such as lacquer, on the lower surface of the armature.

FIGURES 11, 13, 14 and 15 are drawn to the same scale, being derived from greatly enlarged scale working drawings for clarity of small details, and show dual hammer assemblies mounted on the universal carriage body 240. To visualize representative true sizes, the distance between the centers of the two hammer heads seen in FIGURE 13 is 0.100 inch. The left-hand or #1 position hammer and its operating assembly is the same as those components illustrated in FIGURE 10, and the right-hand or #2 position hammer and its operating assembly include the same components although the hammer and armature operator are right-hand instead of left-hand. The actual printing sequence can be left or #1 hammer first and right or #2 hammer second, or vice versa or both can print simultaneously. However, the left-hand hammer always prints in #1 position and the right-hand hammer in #2 position. Accordingly, in FIGURES 11 and 13–15 the left components will be referenced with suffixes "1" and the right components with suffixes "2," the primary reference numbers being those used to identify the single hammer components in FIGURE 10.

The universal hammer block 350 is viewed from the rear in FIGURE 13. It has integral, horizontal comb walls 468 and 469 which are slotted to receive the vertical hammer lever arms 470–1 and 470–2 and maintain the two hammers 410–1 and 410–2 in accurate laterally spaced relationship. Hammers 410 are made of high carbon steel and both hammers are pivoted on the common pivot pin 412 and each is held in exact lateral position in the block 350 by the combs 468 and 469, independently of the other. Thus, the absence of one hammer will not effect the location or operation of the other. A thin square hammer head 472–1, 472–2 is on the side and integral with the upper end of each lever. The perpendicular distance from the face of the head to the rear edge of lever arm 470 is relatively short. The lower arm, 473–2 being seen in FIGURE 11, has a curved abutment contour 474–2 which is operatively engaged by the armature lever abutment curve 452–2, and terminates in a short forwardly projected ear 475–2. Ear 475–2 has a spring seat lug 476–2 on its upper edge receiving a compression coil spring 477–2 which is seated in a blind bore recess 478–2 in the bottom of hammer block 350. Because the abutment contour 474 of each hammer is extremely small and subject to many impacts, it is a critical wear point and is "beefed-up" by a reinforcement sector 480–1, 480–2. On the other hand because of desired high-speed operation the hammer levers arms 470–1 and 470–2, spring ears 475 and heads 472–1 and 472–2 are made as thin as possible to achieve lowest possible hammer mass while retaining strength. The inoperative position of each hammer is determined by back stop set-screws 482–1 and 482–2.

Abutment curve 452 on the armature lever and cooperating curve 474 on the lower short hammer lever arm are made with an involute contour (or as close as possible to an involute in such miniature elements subject to high wear) in order to provide a rolling kinematic pairing to reduce wear and provide a smooth force transfer. There is no impact between the operator lever 448 and the lower hammer lever arm 473 during the hammer power stroke but there is an impact between the abutment curves upon rebound of the hammer from actual printing.

Figures 16, 17, 18:
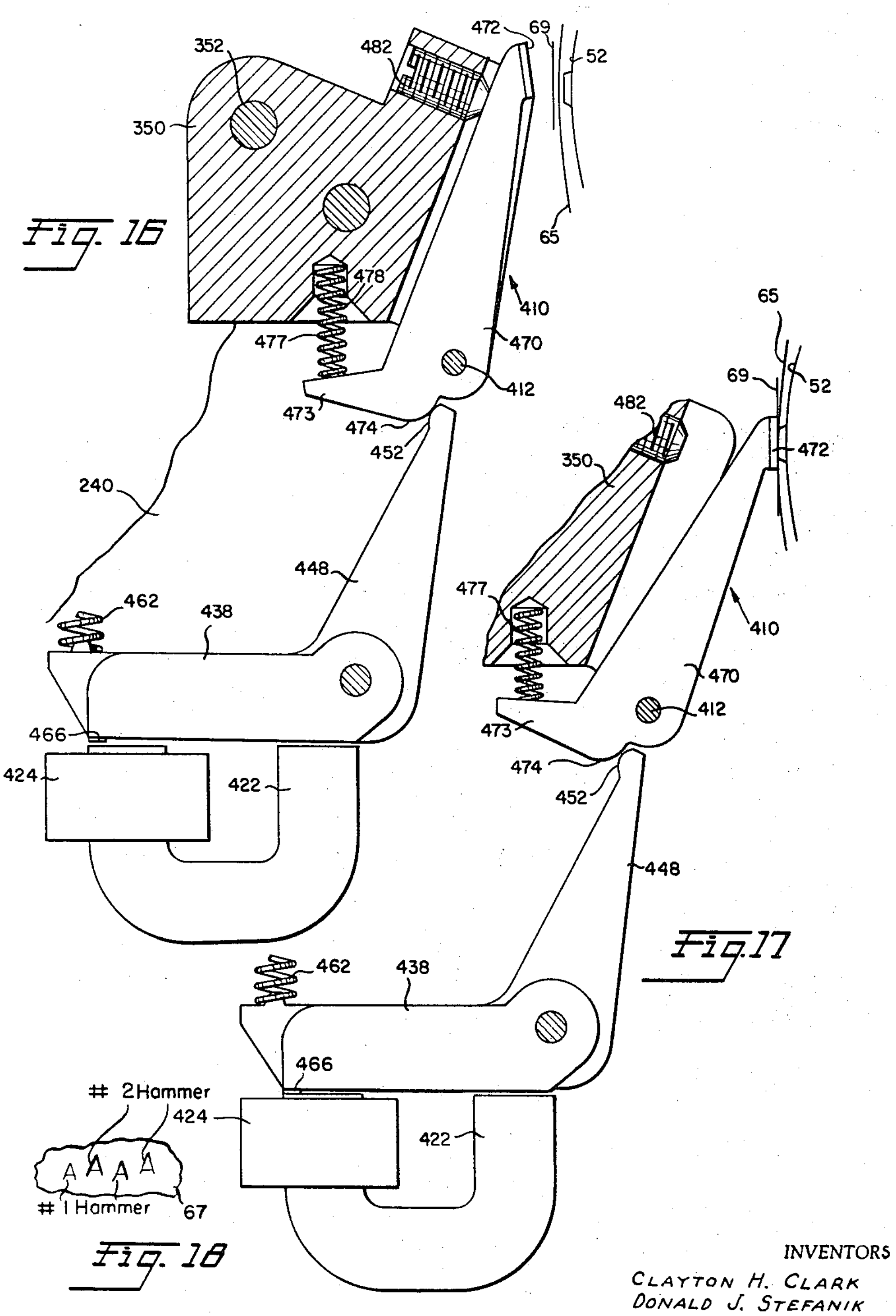
FIGURE 16 is an operational view comparable to FIGURES 11 and 17 and illustrates the position of the print hammer armature lever and the print hammer prior to energization of the print hammer magnet.
FIGURE 17 is another operational view like FIGURES 11 and 16 to illustrate the movement of the print hammer away from the print hammer armature lever as it accomplishes the actual printing operation and prior to rebound and biased return to a rest position.
FIGURE 18 is view of a portion of a record sheet showing misalignment between the two hammers in a dual hammer printer.

The hammer compression spring 477 is stronger than the armature spring 462 and, in the de-energized hammer rest condition shown in FIGURE 16, biases the hammer to its stop position against stop set screw 482 and through the abutment curves 474 and 452 urges armature lever 448 and armature 438 clockwise against the bias of light armature spring 462 and away from the electromagnet core piece 422.

When the print hammer electromagnet coil 424 is momentarily energized by a 600 microsecond one-shot the concentrated flux in the highly efficient ribbon wound core 422, instantly snaps the armature 438 counterclockwise from the position seen in FIGURE 16 to the position seen in FIGURE 11. Between these two positions the kinetic energy force of the minute armature movement is transferred from the long armature lever 448 to the short lower hammer lever 473 through a rolling pairing between the involute curved abutments, and thence to the hammer head with an approximate six to one mechanical advantage due to the leverage. The resultant inertia in hammer 410 enables it to continue clockwise movement at extremely high speed to impact the ribbon 69 and paper 65 against the desired character type face on the rotating drum 52, as illustrated in FIGURE 17. Rebound forces in the hammer after printing impact, plus bias of hammer compression spring 477, result in a minimum dwell time and in effect immediately bring the hammer 410 back against its stop set screw 482. During the return movement, the hammer abutment curve 474 impacts against the armature lever abutment curve 452 and forces the armature to the de-energized position of FIGURE 12. The two springs 477 and 462 tend to dampen bounce and rebound tendencies in the armature 438. Without the armature spring 462, double impressions can occur due to armature bounce and the armature de-energized position can vary, causing resultant variations in intensity of impressions.

In a dual hammer printer, variations in stroke between the two hammers can result in misalignment between the adjacent characters printed by the two hammers. For example, as shown in FIGURE 18, the number 2 hammer is hitting early, before the drum has rotated the A line into proper print position. This misalignment is different from the timing misalignment shown in FIGURE 4, and is corrected by increasing the magnitude of the #2 hammer stroke by unscrewing the #2 hammer stop screw 482–2 until the two adjacent characters align. Likewise, it may be necessary to decrease the magnitude of the #1 hammer stroke.

FIGURE 12 represents a hammer block modification where the hammer 410' relies upon the block 350' as a fixed back stop. There is incorporated in the assembly an adjustable hammer compression spring assembly 490 in which a set screw 492 in a threaded bore 494 can vary the compression in hammer spring 496 to thereby control the speed of the hammer stroke. Change in either of magnitude or speed will change the timing of impact relative to drum rotation.

The electronic logic circuits for a single print hammer printer and for a dual hammer printer arranged for receiving five unit Baudot Code are disclosed and described in parent application Ser. No. 233,109.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A high speed printer comprising a movable type carrier, support structure, at least one pivotable print hammer and associated pivotable electromagnetic hammer operator mounted by said support structure, and means constituting an operative structural coaction between said hammer and said operator, enabling direct force transfer by a rolling kinematic pairing between said operator and said hammer in accomplishing the printing stroke.

2. A shiftable print hammer carriage for use in a movable type carrier page printer, said carriage comprising a universal body means, with first means thereon to pivotally mount single and plural hammers, second means integral therewith to pivotally mount associated single and plural hammer operators, third means to mount associated single and plural operator actuating electromagnets, and means providing operative structural coaction between said associated print hammers and operators, enabling direct force transfer by a rolling kinematic pairing between said associated operators and said hammers in accomplishing each printing stroke.

3. A shiftable print hammer carriage as defined in claim 2, wherein said body means also includes means to mount a pivotable space pawl unit and means to mount and secure a permanent magnet serving as a carriage position signal operator.

4. A print hammer carriage having at least one hammer head on the end of an elongate pivoted hammer lever with a hammer lever operating arm, and an electromagnet with a pivoted armature operator including integral therewith an elongate lever arm longer than said hammer lever arm and with an abutment engagement surface at its free end for engaging said hammer lever arm and adapted, when said electromagnet is energized to transfer movement and impart momentum to the print hammer lever for a printing operation.

5. A print hammer carriage as defined in claim 4, including the provision of involute contours at the respective engaging surfaces of said armature operator lever arm and said shorter arm of said print hammer lever to accomplish a rolling operative engagement during printing force transfer from said operator to said hammer.

6. A printer subassembly comprising a pivotally mounted print hammer lever; an electromagnet with a pivoted armature operator lever; a universal mounting device with structural means for mounting single and plural hammer and operator assemblies including means pivotally mounting said levers and securing said electromagnet, wherein energization of said electromagnet results in a force transfer of movement from said armature lever to said hammer lever with resultant inertia movement of said hammer lever away from the armature lever to accomplish momentum printing impact with a type carrier; and a spring means on said device engaging and biasing said hammer lever toward a return position.

7. In combination with a traveling print carriage having pivotally mounted hammer operating levers, a universal print hammer block adapted to be rigidly clamped to the print carriage; at least one lever type of print hammer and means pivotally mounting said hammer for limited travel in said block, said hammer having an operating force transfer arm, and a curved operator abutment at the free end of said force transfer arm having an involute contour surface to enable a rolling kinematic pairing with an involute contour surface on an associated pivotal operating lever; and means in said block, including spring return means, to vary the timing of the hammer impact with a continuously rotating drum.

8. A high speed drum printer comprising a continually rotating type drum; and a hammer means with a support structure including at least one pivotable print hammer and associated pivotable electromagnetic hammer operator armature means carried by said support structure adapted to engage and actuate said pivotable print hammer, and operable to print selected characters while said drum is rotating.

9. A high speed printer; comprising: a movable type carrier; and a subassembly including a pivotally mounted print hammer having a head movable relatively toward and away from said type carrier between first and second positions, a pivotally mounted operator engageable with said print hammer and including an armature, and an electromagnet to coact with said armature for pivoting said operator for in turn pivoting said print hammer to drive said head from said first position to said second position.

10. A high speed printer as defined in claim 9, wherein the engagement between said print hammer and said operator remains at a substantially constant distance from the pivot axes of said print hammer and said operator.

11. A high speed printer as defined in claim 9, wherein said print hammer and said operator include engagement means providing rolling kinematic pairing therebetween at least during the portion of the movement of said hammer between said first position and second position when said hammer and said operator are in engagement.

12. A high speed printer as defined in claim 11 wherein said subassembly includes means for restricting the pivotal movement of said operator upon attraction of said electromagnet to provide for inertia movement of said hammer away from and out of contract with said operator and toward said second position after it passes an intermediate position in its movement toward said second position, and means for biasing said print hammer away from said type carrier toward said intermediate position and into contact with said operator and thence back to said first position.

13. A high speed printer comprising movable type carrier; and a hammer means with a support structure including at least one pivotable print hammer and associated pivotable electromagnetic hammer operator carried by said support structure, and means constituting an operative structural coaction between said hammer and said operator, enabling direct force transfer by a rolling kinematic pairing in accomplishing the printing stroke; said hammer means including a first spring connected to bias said hammer operator toward its electromagnet energized position, and a second spring, stronger than said first spring, connected to bias said hammer to its return stop position, providing coordinated spring forces to prevent hammer rebound from its return stop position, and to dampen operator bounce tendencies resulting from hammer return movement after printing impact.

14. A printer subassembly comprising a pivotally mounted print hammer lever; an electromagnet with a pivoted armature operator lever; a universal mounting device with structural means for mounting single and plural hammer and operator assemblies including means pivotally mounting said levers and securing said electromagnet, wherein energization of said electromagnet results in a force transfer of movement from said armature lever to said hammer lever with resultant inertia movement of said hammer lever away from the armature lever to accomplish momentum printing impact with a type carrier; first spring means on said device engaging and biasing said hammer lever toward a return position; and second spring means on said device having a lighter spring force than said first spring means engaging and forward biasing said armature operator toward its magnet attracted position and providing structural cooperation with said first spring means through said armature operator and said hammer lever to provide damping of hammer lever rebound and armature operator bounce tendencies occurring as a result of the return stroke of said hammer lever.

References Cited

UNITED STATES PATENTS

| | | | |
|---|---|---|---|
| 1,222,443 | 4/1917 | Mosher | 197—186 |
| 1,487,439 | 3/1924 | Burnham | 317—165 XR |
| 1,652,463 | 12/1927 | Tyberg | 197—16 |
| 2,240,847 | 5/1941 | Hildebrecht | 200—87 |
| 2,600,011 | 6/1952 | MacDonald et al. | 200—87 XR |
| 2,656,240 | 10/1953 | Hell | 197—1 XR |
| 2,686,410 | 8/1954 | Gore et al. | 101—93 |
| 2,787,210 | 4/1957 | Shepard | 101—93 |
| 2,831,424 | 4/1958 | MacDonald | 101—93 |
| 2,874,634 | 2/1959 | Hense | 101—93 |
| 3,076,877 | 5/1963 | D'Arcy | 200—87 |
| 3,104,289 | 9/1963 | Segel | 200—87 XR |
| 3,110,250 | 11/1963 | Fradkin | 101—93 |
| 3,128,696 | 4/1964 | Hoffman | 101—93 |
| 3,129,680 | 4/1964 | Doernev | 200—87 XR |
| 3,135,195 | 6/1964 | Potter | 101—93 |
| 3,154,672 | 10/1964 | Larkin | 200—87 XR |
| 3,164,085 | 1/1965 | Hawkins | 101—93 |
| 3,183,830 | 5/1965 | Fisher et al. | 101—93 |
| 3,201,514 | 8/1965 | Kleinschmidt et al. | 101—93 XR |
| 3,249,713 | 5/1966 | Briggs | 200—87 |

ROBERT E. PULFREY, *Primary Examiner.*

E. S. BURR, *Assistant Examiner.*

U.S. Cl. X.R.

200—87

Disclaimer 3,417,690.—*Clayton H. Clark*, Mundelein, and *Donald J. Stefanik*, Berwyn, Ill. ROLLING CONTACT PRINTER HAMMER AND HAMMER CARRIAGE. Patent dated Dec. 24, 1968. Disclaimer filed Nov. 18, 1969, by the assignee, *SCM Corporation*.

Hereby enters this disclaimer to claims 1 through 14 of said patent.

[*Official Gazette December 30, 1969.*]

UNITED STATES PATENT OFFICE
CERTIFICATE OF CORRECTION

Patent No. 3,417,690 December 24, 1968

Clayton H. Clark et al.

It is certified that error appears in the above identified patent and that said Letters Patent are hereby corrected as shown below:

Column 7, line 4, "adjusing" should read -- adjusting --. Column 11, line 27, "425" should read -- 452 --; lines 29 and 33, cancel "452", each occurrence. Column 14, line 65, "contract" should read -- contact --.

Signed and sealed this 10th day of March 1970.

(SEAL)
Attest:

Edward M. Fletcher, Jr.
Attesting Officer

WILLIAM E. SCHUYLER, JR.
Commissioner of Patents